Sept. 13, 1932.  N. TRBOJEVICH  1,876,796
SCREW THREAD
Filed March 2, 1931    2 Sheets-Sheet 1

Fig.1.a.

INVENTOR
Nikola Trbojevich
BY Whittemore Hulbert Whittemore
+ Belknap  ATTORNEYS Sept. 13, 1932.  N. TRBOJEVICH  1,876,796
SCREW THREAD
Filed March 2, 1931   2 Sheets-Sheet 2

INVENTOR
Nikola Trbojevich
BY Whittemore Hulbert Whittemore
+ Belknap   ATTORNEYS Patented Sept. 13, 1932

1,876,796

UNITED STATES PATENT OFFICE

NIKOLA TRBOJEVICH, OF DETROIT, MICHIGAN

SCREW THREAD

Application filed March 2, 1931. Serial No. 519,578.

The invention relates to a novel form of screw thread applicable to worms, screws and nuts.

The invention resides in so forming the thread surfaces in a screw that they will possess a negative Gaussian or hyperbolic curvature at any point thereof. This is accomplished by forming the contours curved and concave in the axial plane, and convex in the plane perpendicular to the said axis, the opposite being true for the cooperating nuts.

Heretofore, the screw surfaces were convex at every point thus possessing only a single family or system of the so-called asymptotic lines, i. e. lines along which the radii normal to the surface are infinite. I have discovered that for the work of this character hyperbolic or saddle-shaped surfaces are greatly to be preferred inasmuch as they possess two families of asymptotic lines forming a network in the surface.

The object of this invention is to increase the number and density of the asymptotic lines in a screw surface and thereby "stiffen" the same.

Another object is to form the cooperating contours in the screw and nut of a slightly different curvature, thus providing a point contact only when not loaded and a surface contact when under load. By this arrangement I preserve the tangential nature of contact in spite of certain (limited) manufacturing inaccuracies.

In a modification of this principle a thread surface is constructed which has a constant efficiency factor at any point thereof.

In another modification I so select the principal radii of curvature that the asymptotic lines will form an orthogonal network thereby producing the maximum surface rigidity or stiffness.

In the drawings

Figure 1a is an enlarged view of the cooperating thread surfaces with the curvature exaggerated;

Figure 1:
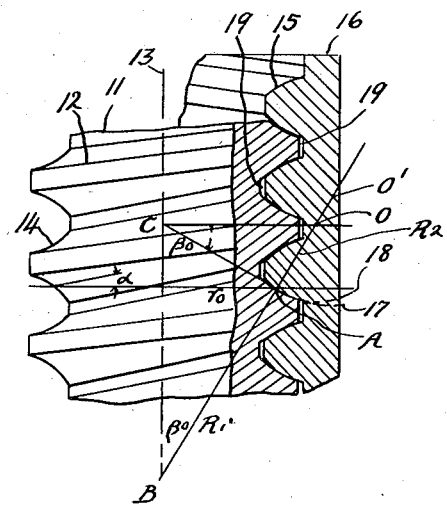
Figure 1 is the elevation of my improved screw and nut.

In Figure 1 the screw 11 has a helical thread 12 wound about the cylinder axis 13. The flanks 14 of the screw and the flanks 15 of the nut 16 are the circular arcs 17 and 18 respectively struck from the centers O' and O and tangent at the pitch point A. The screw radius A O' is by about ten per cent longer than the nut radius A O, said discrepancy in length being selected with a view of affording a suitable manufacturing tolerance without sacrificing the tangential nature of contact essential for a smooth and dependable operation.

A bottom clearance 19 is provided at the roots of the cooperating threads. The nominal pressure angle $\beta_0$ may be arbitrarily selected and its value will be about 30° for ordinary screws and from 14½ to 20° for work screws.

The principal radii of curvature in the new thread surface are $AB = R_1$ and $AO = R_2$, Figure 1, the influence of the usually small helix angle $\alpha$ being neglected. The first radius $R_1$ represents, therefore, the curvature along the helix and is positive for the screw and negative for the nut while $R_2$ pertains to the axial contours and is always of the opposite sign to $R_1$.

It is now possible to determine the radius of curvature R of the surface at any desired normal plane passing through the normal to the surface at the point A and forming a known angle with either one of the principal planes $R_1$ and $R_2$. By calculation, this is done by solving the Euler equation and, graphically, the radius may be scaled off from the Dupin indicatrix, Figure 2.

With the half axes $\sqrt{R_1}$ and $\sqrt{R_2}$ respectively two pairs of conjugate hyperbolas are constructed. In any selected direction A D the radius of curvature will be $$\sqrt{R} = AD \quad (1)$$

Of particular interest are the radii in the asymptotes 24 and 25 as they are both infinite. The asymptotic angle $\delta$ is readily found from the equation $$\tan \delta = \frac{\sqrt{R_2}}{\sqrt{R_1}} \quad (2)$$

Figure 2:
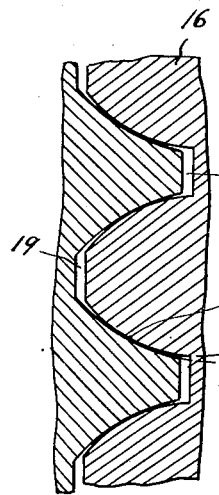
Figure 2 is the Dupin's indicatrix taken at the point "A", Figure 1.
Figure 2:
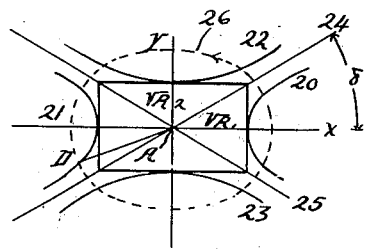

If now the indicatrix in Figure 2 be considered as the tangent plane of the surface at the point A, the areas 20 and 21 represent the convex and the areas 22 and 23 the concave portions of the surface. Said areas merge one into the other with an inflexion along the asymptotes 24 and 25 and it will be obvious even without a mathematical calculation that the radii of curvature at the points of junction must be infinite as the surface is neither convex or concave at any such point.

Figure 3:
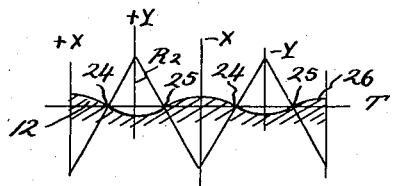
Figures 3 to 7 are diagrams explanatory of the structural advantages possessed by hyperbolic surfaces in general.
Figure 12:
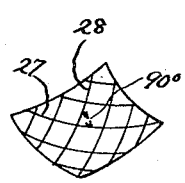
Figure 12 shows a portion of a "minimal" surface which may be constructed on this principle.
Figure 5:
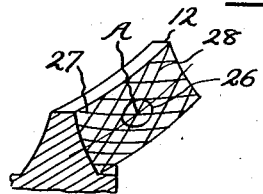
Figure 6:

The nature of the surface in the neighborhood of the point A may be further studied by following the closed orbit 26 in the direction of the arrow. Starting from the plus X axis the path is downhill until the plus Y axis is reached after which the path turns uphill toward the minus X axis and so on. In a complete cycle two maxima, two minima and four points of inflexion are passed as it will be further understood by studying the upper half of the Figure 3 which shows the development of the orbit 26 in the plane of paper. The tangent plane T crosses the surface with an inflexion at the asymptotes as shown in Figure 6. The network of the asymptotic lines comprising two systems 27 and 28 is shown in Figure 5.

Figure 4:
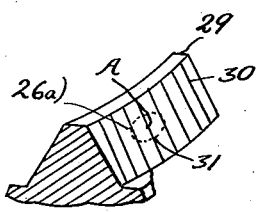
Figure 7:

On the other hand, in the standard U. S. thread 29 (Figure 4) there is only a single system of the asymptotic lines 30, and the orbit 26a) as shown in the lower half of the Figure 3 crosses only twice in a cycle the locus 31 of infinite radius of curvature, see also Figure 7.

I shall now show the solution of the problem in which the radius $R_2$ is so selected with reference to the pitch radius $r_0$ of the screw that the resulting hyperbolic surface will have a constant efficiency at any point thereof. The practical significance of this improvement lies in the fact that while in the ordinary screw the efficiency is variable from the roots to the tips of the thread due to a variable helix angle, in my construction I counteract the said variation by also varying the pressure angle at the same time. A constant efficiency also means a constant or uniform lack of efficiency throughout the surface and by this method screws of an increased frictional holding power may be constructed.

Figure 8:
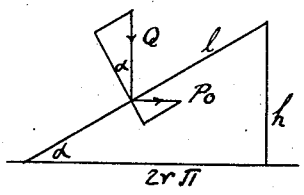
Figures 8 to 11 are geometrical diagrams from which the equations 3 to 20 are deduced.

In Figure 8 let the screw element $l$ be subjected to a vertical force Q representing the load upon the nut. If the friction $f$ and the pressure angle $\beta$ of the screw thread be disregarded for the time being, an ideal force $P_0$ will be sufficient to hold the force Q in balance, namely $$P_0 = Q \sin \alpha \quad (3)$$

Due to the existence of the pressure angle and friction the value of $P_0$ will be increased to P, viz;

$$P = Q \frac{h \cos \beta + 2r \pi f}{2r \pi \cos \beta - h f} \quad (4)$$

where $h$ is the lead of the screw, $r$ the (variable) radius. The deduction of the Equation (4) may be found in Freytag, Maschinenbau, 1920 edition page 136. The efficiency of the screw will then be $$\eta = \frac{P_0}{P} \quad (5)$$

and the lack of efficiency $F = 1 - \eta$ after suitable simplifications will be $$F = \frac{f(1 + \tan^2 \alpha)}{\tan \alpha \cos \beta + f} \quad (6)$$

where $$\tan \alpha = \frac{h}{2r \pi} \quad (7)$$

Figure 10:
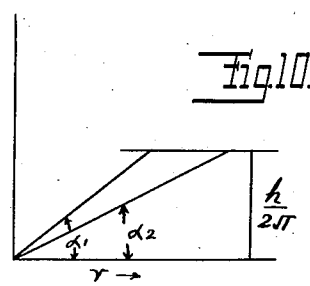

The helix angle $\alpha$ decreases as the radius $r$ increases, see Figure 10. The value of $\tan^2 \alpha$ in the numerator of the Equation (6) is readily negligible for small helix angles. Thus, $$F = \frac{f}{\tan \alpha \cos \beta + f} \quad (6a)$$

Figure 9:
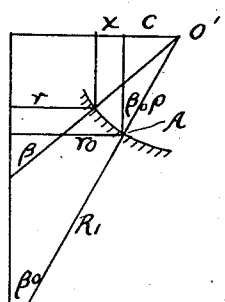

In order to keep the value of F a constant it is necessary that $$\tan \alpha \cos \beta = \text{const.} = \tan \alpha_0 \cos \beta_0 \quad (8)$$

where the null suffix denotes quantities pertaining to the pitch point A, Figure 9.

From Figure 10 let $$\frac{h}{2\pi} = h_0 \quad (9)$$

where $h_0$ is the lead per radian. Then $$\tan \alpha = \frac{h_0}{r} \quad (10)$$

$$\tan \alpha_0 = \frac{h_0}{r_0} \quad (11)$$

$$\frac{\tan \alpha}{r} = \frac{\tan \alpha_0}{r_0} = \text{const.} \quad (12)$$

But from Figure 9

$$\sin \beta_0 = \frac{c}{\rho} \quad (13)$$

$$\sin \beta = \frac{c + x}{\rho} \quad (14)$$

$$\sin \beta = \sin \beta_0 + \frac{x}{\rho} \quad (15)$$

From (8) and (12)

$$\cos \beta = \frac{r}{r_0}\cos \beta_0 = \left(1 - \frac{x}{r_0}\right) \cos \beta_0 \quad (16)$$

Squaring and adding the last two equations $$1 = \sin^2 \beta_0 + \frac{x^2}{\rho^2} + 2 \sin \beta_0 \frac{x}{\rho}$$

$$+ \cos^2 \beta_0 \left(1 - \frac{2x}{r_0} + \frac{x^2}{r_0^2}\right) \quad (17)$$

As the distance $x$ is relatively small, its square may be omitted.

$$0 = 2 \sin \beta_0 \frac{x}{\rho} - \cos^2 \beta_0 \frac{2x}{r_0} \quad (18)$$

from which $x$ vanishes.

$$\rho = r_0 \frac{\sin \beta_0}{\cos^2 \beta_0} \quad Q.\ E.\ D. \quad (19)$$

For example, let $\beta_0 = 30°$. Then $\sin = \frac{1}{2}$ and $\cos^2 = \frac{3}{4}$ $$\rho = \frac{2}{3} r_0 \quad (20)$$

*Rule 1.*—To obtain a constant efficiency the radius of the concave face is equal to two-thirds of the pitch radius, for 30 degrees pressure angle.

The asymptotic angle $$\tan \delta = \sqrt{\frac{\rho}{R_1}} = \sqrt{\frac{\sin^2 \beta_0}{\cos^2 \beta_0}} = \pm \tan \beta_0 \quad (21)$$

$$\delta = \pm \beta_0 \quad (22)$$

showing that the asymptotic lines are symmetrically disposed relative to the pitch helix and intersect the same at an angle $\beta_0$.

Figure 11:
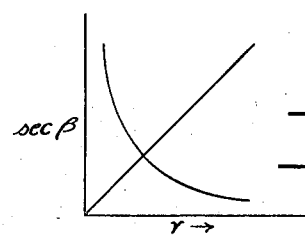

The tooth curve is necessarily concave in the screw because if $$\tan \alpha \cos \beta = \text{constant}$$

then also
$r \sec \beta$ must be a constant because of (10) The latter, however, is an equilateral hyperbola in $r$ and $\sec \beta$, Figure 11. Thus, when $r$ increases $\sec \beta$ (and also $\beta$) must diminish proving that the pressure angle is greater at the roots than at the tips. In other words the curve is such as shown in Figure 9.

If it is desired to construct a surface of this kind possessing the greatest possible surface rigidity, the concave radius $\rho$ should be so selected that the average radius of curvature of the surface be the maximum. It is possible to do so. In fact, it is possible to make the average radius equal to infinite. According to Cauchy $$\frac{1}{R_m} = \frac{1}{R_1} - \frac{1}{\rho} \quad (23)$$

where $R_m$ is the mean or average radius. If this be infinite, the left hand side of the equation will become zero and I have $$R_1 = \rho = \frac{r_0}{\sin \beta_0} \quad (24)$$

and $$\tan \vartheta = \pm \sqrt{1} \quad (25)$$

or $$\vartheta = \pm 45°$$

*Rule 2.*—If I select the radius of the tooth flank equal to the pitch diameter (for 30 degrees pressure angle) the surface will have the maximum strength and the asymptotic lines will cross each other at right angles.

In action the new screw and nut will only contact with a point contact because I employ a longer radius in the screw flank than in the nut flank. Thus the screw or the nut is easily manipulated when not loaded and may be constructed with less backlash than the present screws. When loaded, the mating concave and convex curves will flatten out and produce a bearing area. It will be seen that this principle is sound because a bearing area is not needed unless there is a load to transmit. At the same time the mean radius of curvature is enormously increased. As was stated in connection with the Equation 23 I can make the mean radius of the surface of any magnitude whatever by suitably selecting the flank radius $\rho$. On the other hand, in common screws the flank is a straight line, $\rho$ equals infinite and from 23

$$R_m = R_1 = \frac{r_0}{\sin \beta_0} \quad (26)$$

i. e. the mean surface radius cannot be greater than the pitch diameter of the screw, for 30 degrees pressure angle.

The flank radius $OA = \rho$ of the constant-friction screw, Equation 19 is readily obtained by a simple projection as shown in Figure 1. I drop the perpendicular A C upon the normal A B thus obtaining the point C in the axis 13 of the screw. Another perpendicular C O is dropped (this line upon the axis 13) thus finding the center of curvature O in the normal B A O. This satisfies the Equation 19 perfectly because $$AC = \frac{r_0}{\cos \beta_0} \quad (27)$$

and $$OA = AC \tan \beta_0 = r_0 \frac{\sin \beta_0}{\cos^2 \beta} = \rho \quad (28)$$

exactly the same result as in the Equation 19.

What I claim as my invention is:

1. A screw having a helical thread of a constant pitch wound about an axis in which the thread contours are curved and concave in the axial plane and so inclined as to produce a gradually diminishing pressure angle as measured from the roots toward the tips of the thread.

2. A screw having a helical thread of a constant pitch wound about an axis in which the thread contours in the axial plane are substantially circular arcs drawn from centers lying on the outside of the pitch cylinder in such a manner that the said contours are concave on both sides of the thread in the axial plane thereof and have a continuously varying pressure angle which diminishes from the roots toward the tips of the thread.

3. A screw having a helical thread of a constant pitch wound about a pitch cylinder and concave curved flanks at its both sides as measured in the axial plane thereof, in which the radius of curvature of the said flanks is selected with reference to the pitch diameter and pressure angle in such a manner that the asymptotic lines will cross the pitch helix at an angle substantially equal to the said pressure angle thereby obtaining a screw of an increased self locking ability.

4. A screw having a cylindrical body and a helical thread wound thereon in which the thread cross contours in the axial plane are curved and concave and in which the radius of curvature of the said contours is substantially equal to the normal surface radius as measured in the plane tangent to pitch helix thereby producing an orthogonal network of asymptotic lines and a surface of an increased load bearing ability.

5. A cooperating screw and nut in which the thread contours in the axial plane are curved, concave and possess an ever diminishing pressure angle from the roots toward the tips of the thread, in the screw, and are curved, convex and tangential at a point to the mating screw contours, in the nut.

6. A cooperating screw and nut in which the contours of the screw thread in the axial plane are curved and concave at all points thereof and the mating contours in the nut are curved and convex, the relation being such that the mating contours in the members are tangent to each other and the radius of curvature of the concave contours is greater than the radius of the convex contours.

7. A screw thread formed about an axis in a helix in such a manner that the radius of curvature of its contours in the axial plane lies at one side of the thread surface and the radius of the contours in the plane perpendicular to the axis lies at the other side of the said surface thus forming a saddle shaped surface having two series of asymptotic lines.

In testimony whereof I affix my signature.

NIKOLA TRBOJEVICH.